(12) United States Patent
Wang et al.

(10) Patent No.: US 12,405,701 B2
(45) Date of Patent: Sep. 2, 2025

(54) VIDEO CONFERENCE DEVICE AND OPERATION METHOD THEREOF

(71) Applicant: AmTRAN Technology Co., Ltd., New Taipei (TW)

(72) Inventors: De-Cyuan Wang, New Taipei (TW); Chia-Wei Lin, New Taipei (TW); Cheng-En Hsiao, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 268 days.

(21) Appl. No.: 18/048,856

(22) Filed: Oct. 24, 2022

(65) Prior Publication Data

US 2023/0185423 A1  Jun. 15, 2023

(30) Foreign Application Priority Data

Dec. 15, 2021  (TW) .................................. 110147065

(51) Int. Cl.
*G06F 3/04812* (2022.01)
*G06F 3/01* (2006.01)
(Continued)

(52) U.S. Cl.
CPC .......... *G06F 3/04812* (2013.01); *G06F 3/017* (2013.01); *H04L 63/0861* (2013.01); *H04L 65/1069* (2013.01); *G06F 2203/04801* (2013.01)

(58) Field of Classification Search
CPC ................. G06F 3/04812; G06F 3/017; G06F 2203/04801; G06F 3/011; G06F 21/32;
(Continued)

(56) References Cited

U.S. PATENT DOCUMENTS 8,874,090 B2   10/2014  Abuan et al.
9,104,241 B2    8/2015  Le et al.
(Continued)

FOREIGN PATENT DOCUMENTS

CN   101370115 A    2/2009
CN   113132670 A    7/2021
(Continued)

OTHER PUBLICATIONS

3Cdaily, "Turn Your Phone into a Remote! Control Your PC Remotely with the Free and Super Useful App 'Remote Mouse'", published on May 20, 2020.

*Primary Examiner* — Duc Nguyen
*Assistant Examiner* — Carissa A Jones
(74) *Attorney, Agent, or Firm* — CKC & Partners Co., LLC

(57) ABSTRACT

A video conference device includes a camera, a communication circuit and a processor. The camera is configured to capture a real-time video of a first location. The communication circuit is communicatively connected to a remote server and a first electronic device located at the first location. The processor executes an online conference application, and processes the real-time video and real-time visual signals received from the remote server via the communication circuit. The processor executes the online conference application to establish or join an online video conference on the remote server. The processor obtains first authentication information from the first electronic device via the communication circuit, sends the first authentication information for identity authentication, and receives first operation authorizations granted to the first electronic device by the remote server based on the first authentication information. The first operation authorizations enable the first electronic device to control a first representative cursor.

5 Claims, 6 Drawing Sheets

(51) Int. Cl.
*H04L 9/40* (2022.01)
*H04L 65/1069* (2022.01)

(58) Field of Classification Search
CPC . G06F 21/44; H04L 63/0861; H04L 65/1069; H04L 65/1073; H04L 65/403; H04N 7/15
USPC .......... 348/14.03, 14.02, 14.08, 14.09, 14.1, 348/14.77, 14.78
See application file for complete search history.

(56) References Cited

U.S. PATENT DOCUMENTS

| | | |
|---|---|---|
| 9,513,776 B2 | 12/2016 | Webb et al. |
| 10,353,483 B2 | 7/2019 | Kramer et al. |
| 11,170,784 B2* | 11/2021 | Truong ............... H04L 63/0861 |
| 2013/0305337 A1* | 11/2013 | Newman .......... H04N 21/42203 |
| | | 726/7 |
| 2013/0342762 A1* | 12/2013 | Wang .................. H04N 5/2628 |
| | | 375/240.26 |
| 2016/0072863 A1* | 3/2016 | Wu ..................... H04L 65/1089 |
| | | 715/753 |
| 2021/0314526 A1* | 10/2021 | Astarabadi ............ H04L 9/0819 |
| 2021/0377587 A1* | 12/2021 | Ekanayake ............ H04N 7/142 |
| 2022/0203996 A1* | 6/2022 | Katz ..................... B60W 50/14 |

FOREIGN PATENT DOCUMENTS

| | | |
|---|---|---|
| TW | 200616396 A | 5/2006 |
| TW | 201322167 A | 6/2013 |

\* cited by examiner

VIDEO CONFERENCE DEVICE AND OPERATION METHOD THEREOF

RELATED APPLICATIONS

This application claims priority to Taiwan Application Serial Number 110147065, filed Dec. 15, 2021, which is herein incorporated by reference.

BACKGROUND

Technical Field

The present disclosure relates to a video conference system and an operation method thereof. More particularly, the present disclosure relates to a video conference system and an operation method thereof that allow multiple users to operate concurrently.

Description of Related Art

In typical online video conference systems, a presenter usually broadcasts his/her display screen or application screen, or the presenter selects which participant's screen to be broadcast. In this manner, all the participants can view the same presentation screen together to facilitate the discussion in the conference. If it is necessary to discuss the content of the presentation during the conference, only the screen provider can use the cursor to mark a position within the presentation screen, and the other participants need to use language or body movements to express where the content he/she wants to discuss is on the presentation screen. For example, if a participant asks a question about an item at a certain location on the presentation screen, the other participants need to find out where the item corresponding to the question is located on the presentation screen based on the narration of the questioner. The participant controlling the cursor also needs to find the position of the item corresponding to the question on the presentation screen so he/she can move the cursor to mark the position, which causes much trouble for large-scale online conferences. Not everyone participating in the conference can immediately find which part on the presentation screen the currently discussed content is displayed. Therefore, there may be an inconvenient situation that the conference cannot continue until every participant finds the discussed item on the presentation screen, or an inconvenient situation that some participants cannot keep up with the discussion.

SUMMARY

The present disclosure provides a video conference device including a camera, a communication circuit and a processor. The camera is configured to capture a real-time video of a first location. The communication circuit is configured to be communicatively connected to a remote server and a first electronic device located at the first location. The processor is configured to execute an online conference application, and configured to process the real-time video of the first location captured by the camera and real-time visual signals received from the remote server via the communication circuit. The processor executes the online conference application to establish or join an online video conference on the remote server. The processor obtains first authentication information from the first electronic device via the communication circuit and sends the first authentication information for identity authentication. The processor receives first operation authorizations granted to the first electronic device by the remote server based on the first authentication information which is recognized as a first participant of the online video conference. The first operation authorizations enable the first electronic device to control a first representative cursor assigned to the first participant of the online video conference on a real-time conference screen. The processor obtains a first operation instruction message from the first electronic device via the communication circuit and transmits the first operation instruction message to the remote server in real time. The communication circuit transmits the processed real-time video of the first location to the remote server and receives the real-time visual signals of the online video conference from the remote server. The real-time visual signals of the online video conference provide images of the real-time conference screen which includes a real-time shared content screen. If the first operation instruction message includes a first operation instruction of moving the first representative cursor and the first operation instruction is valid based on the first operation authorizations and display settings of the online video conference, the real-time conference screen displays the first representative cursor positioned in the real-time shared content screen in response to the first operation instruction of moving the first representative cursor.

The present disclosure provides a video conference device including a camera, a communication circuit and a processor. The camera is configured to capture a real-time video of a first location, and configured to capture a first biometric feature of a first user located at a first location with the video conference device as first authentication information. The communication circuit is configured to be communicatively connected to a remote server. The processor is configured to execute an online conference application, and configured to process the real-time video of the first location captured by the camera and real-time visual signals received from the remote server via the communication circuit. The processor executes the online conference application to establish or join an online video conference on the remote server. The processor receives the first authentication information from the camera, and sends the first authentication information via the communication circuit for identity authentication. The processor receives first operation authorizations granted to the first user by the remote server based on the first authentication information which is recognized as a first participant of the online video conference. The first operation authorizations enable the first user to control a first representative cursor assigned to the first participant of the online video conference on a real-time conference screen. The processor receives a specific gesture of the first user via the camera, recognizes the specific gesture to obtain a first operation instruction message, and transmits the first operation instruction message to the remote server in real time. The communication circuit transmits the processed real-time video of the first location to the remote server and receives the real-time visual signals of the online video conference from the remote server. The real-time visual signals of the online video conference provide images of the real-time conference screen which includes a real-time shared content screen. If the first operation instruction message includes a first operation instruction of moving the first representative cursor and the first operation instruction is valid based on the first operation authorizations and display settings of the online video conference, the real-time conference screen displays the first representative cursor positioned in the real-time shared content screen in response to the first operation instruction of moving the first representative cursor.

The present disclosure provides an operation method of a video conference device including the following operations: capturing a real-time video of a first location via a camera of the video conference device; establishing or joining an online video conference via a remote server; processing the real-time video of the first location captured by the camera and real-time visual signals received from the remote server via a communication circuit of the video conference device; obtaining authentication information of a user or an electronic device located at the first location with the video conference device, in which the authentication information is received from the camera or the communication circuit; sending the authentication information for identity authentication; receiving operation authorizations granted to the user or the electronic device by the remote server based on the authentication information which is recognized as a first participant of the online video conference, in which the operation authorizations enable the user or the electronic device to control a first representative cursor assigned to the first participant of the online video conference on a real-time conference screen; obtaining a first operation instruction message from the user or the electronic device; and transmitting the first operation instruction message to the remote server in real time. If the first operation instruction message comprises a first operation instruction of moving the first representative cursor and the first operation instruction is valid based on the operation authorizations and display settings of the online video conference; the real-time conference screen displays the first representative cursor positioned in the real-time shared content screen in response to the first operation instruction of moving the first representative cursor.

One of the advantages of the above intelligent conference system and operation method thereof is that it is convenient for participants other than the presenter to explain and illustrate.

It is to be understood that both the foregoing general description and the following detailed description are by examples, and are intended to provide further explanation of the disclosure as claimed.

DESCRIPTION OF THE EMBODIMENTS

Figure 1A:
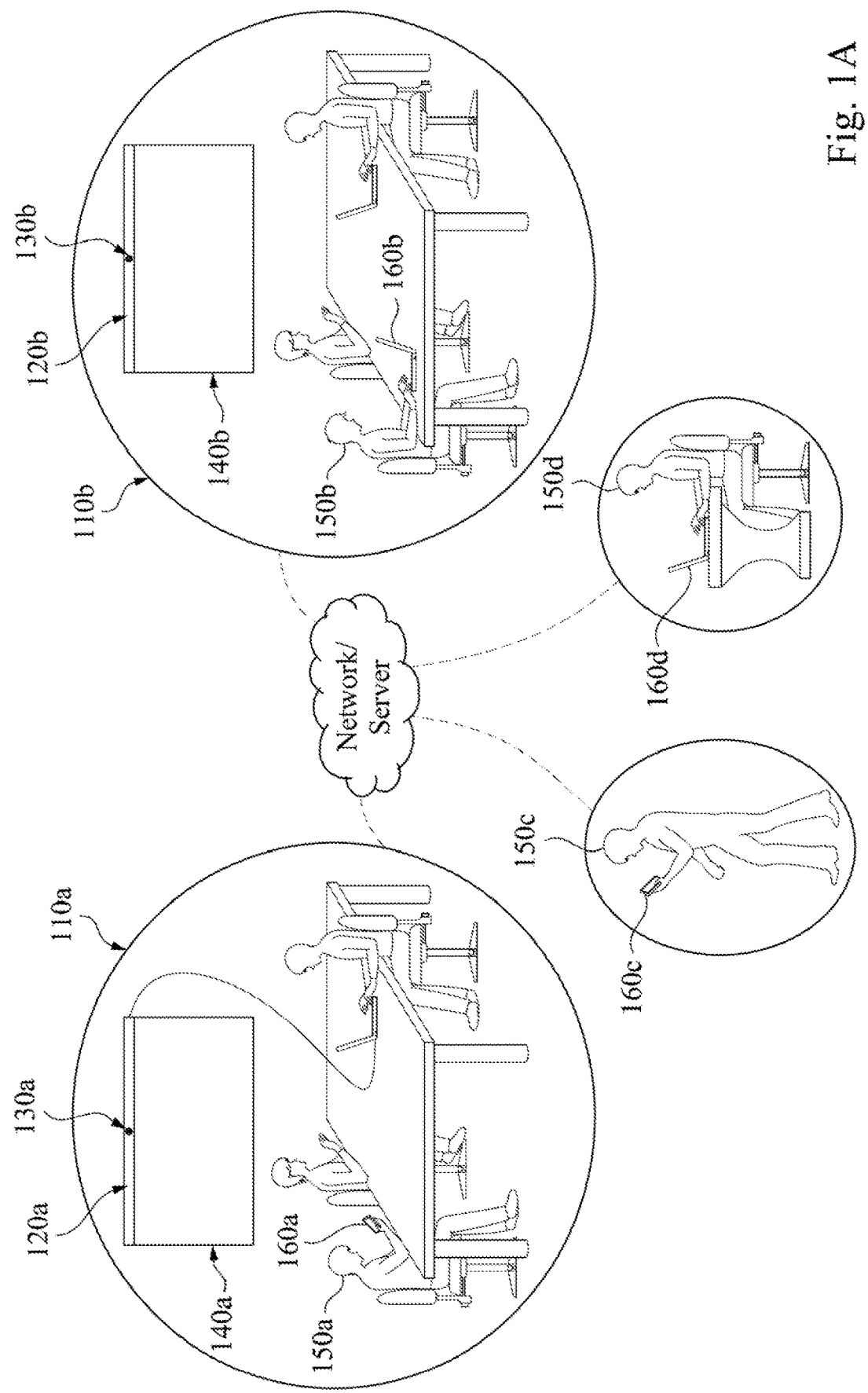
FIG. 1A depicts a schematic diagram showing an operation of multiple intelligent conference systems according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1A depicts a network diagram showing intelligent conference systems 110a and 110b in operation according to embodiments of the present disclosure. The intelligent conference systems 110a and 110b are configured to conduct an online conference via a server, and the online conference allows remote users 150c and 150d to join respectively via remote mobile devices 160c and 160d. In some embodiments, the intelligent conference system 110a, the intelligent conference system 110b, the remote user 150c, and the remote user 150d may not be in a same space and communicate with one another via a network. For example, the intelligent conference system 110a, the intelligent conference system 110b, and the remote mobile devices 160c and 160d respectively held by the remote users 150c and 150d are communicatively coupled to the server at different locations via the network.

The intelligent conference system 110a includes a conference device 120a at the first location, a display device 140a, and at least one mobile device 160a located near the conference device 120a, for example, in a same conference room. The intelligent conference system 110b includes a conference device 120b at the second location, which can be another conference room, a display device 140b, and at least one mobile device 160b located near the conference device 120b, for example, in the same conference room remote to the first location. The conference devices 120a and 120b are configured to be connected to a server to establish or participate in an online conference and are configured to respectively control the images displayed by the display devices 140a and 140b according to data sent by the server. To simplify matters, the present disclosure describes the conference device 120a of the intelligent conference system 110a as a conference host device of the online conference, and describes the conference device 120b of the intelligent conference system 110b as a conference participant device of the online conference. However, the present disclosure is not limited in this regard, and the conference devices 120a and 120b of the intelligent conference systems 110a and 110b can exchange their identities with each other. In the present disclosure, the intelligent conference systems 110a and 110b or devices operated by other users are all capable of establishing an online conference on the server and obtaining an authorization of the conference host device. The conference host device has functions enabled corresponding to the online conference hosted by itself, such as setting operation authorizations of all participants, and etc., and the conference participant devices can join the established online conference. The quantity of the conference participant devices is not limited to the number shown in the figure, and FIG. 1A is only used as an example for illustration. The relevant content is described in detail in the following paragraphs.

With additional reference to the intelligent conference system 110a of FIG. 1A, the mobile device 160a is configured to be communicatively coupled to the conference device 120a in a wired or wireless manner. By operating an online conference application in the mobile device 160a or by a personal characteristic recognition process, such as face, voiceprint, gesture, or speech recognition process, a user 150a can sign in the online conference via the conference device 120a to obtain the operation authorizations in the online conference, or the user can generate or send an operation instruction message to the conference device 120a in the same manner. In some embodiments, if the user 150a carrying the mobile device 160a moves to a place remote to the first location where the intelligent conference system 110a is located, then the user 150a can be regarded as the remote user 150c or 150d and the mobile device 160a carried by the user 150a can be regarded as the remote mobile device 160c or 160d. The remote mobile device 160c or 160d, remote to the first and second locations, can directly connect to the server via the online conference application without going through the intelligent conference system 110a or 110b. The above description about the intelligent conference system 110a is also applicable to the intelligent conference system 110b. To simplify matters, a description in this regard is not provided.

In some embodiments, if the remote mobile devices 160c and 160d join the online conference established by the conference device 120a of the intelligent conference system 110a, the remote mobile devices 160c and 160d obtain the real-time video and audio at the remote locations and transmit to the server. The remote mobile devices 160c and 160d also obtain the real-time conference video, audio, and the operation authorizations directly from the server and can directly send the operation instruction messages to the server. The detailed methods of obtaining the operation authorizations and sending the operation instruction messages by the remote mobile devices 160c and 160d are described in the following paragraphs, and a description in this regard is not provided here. In some embodiments, there may be more than two intelligent conference systems that participate in one online conference at the same time, and the conference device that establishes the online conference, for example, the conference device 120a of the intelligent conference system 110a, serves as the conference host device, and the other conference devices, for example, the conference device 120b of the intelligent conference system 110b, are all conference participant devices.

In some embodiments, the user 150a of the intelligent conference system 110a can establish the online conference on the server, create various participant types of operation authorizations for the online conference, for example, senior executive, client or other types, and set the scope of permission for each participant type of the operation authorizations via the conference device 120a.

Figure 1B:
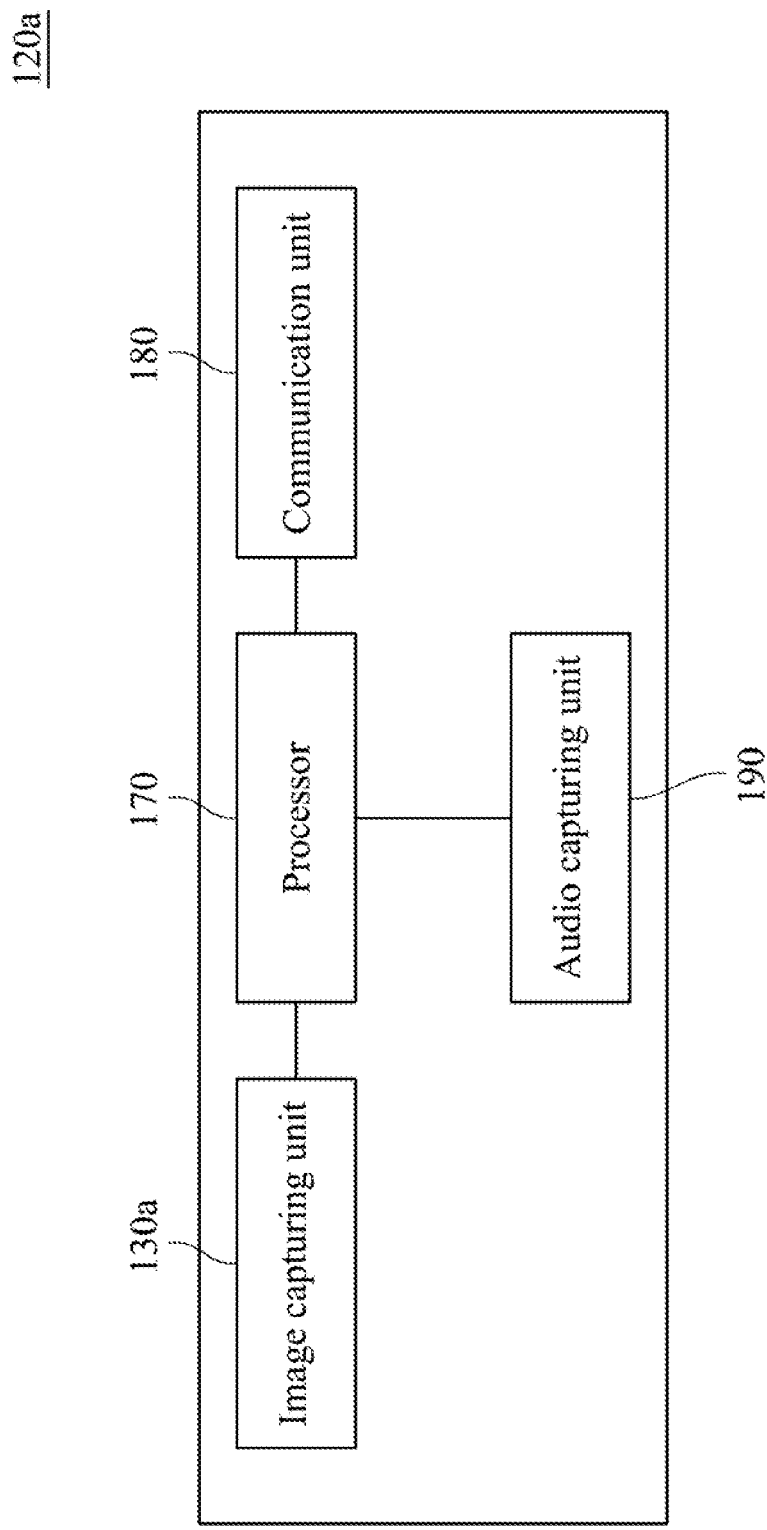
FIG. 1B depicts a simplified functional block diagram of the conference devices in FIG. 1A.

FIG. 1B depicts a simplified functional block diagram of the conference devices in FIG. 1A. The conference device 120a includes an image capturing unit 130a, a processor 170, a communication unit 180, and an audio capturing unit 190, for example, a microphone, a microphone array, or device with microphone module connected to the conference device 120a. The processor 170 is coupled to the communication unit 180, and configured to execute the online conference application and to provide functions of user interface and connection interface for connecting devices. The communication unit 180 is configured to be communicatively connected to the mobile device 160a and the server. The communication unit 180 can be the network circuits which achieve the communication connection with the mobile device 160a with a signal cable, such as a HDMI cable or a network cable, Bluetooth, Wi-Fi direct connection, or other suitable wired or wireless connections. The communication unit 180 can achieve the communication connection with the server via the Internet. The processor 170 is further coupled to the image capturing unit 130a, the audio capturing unit 190, and the display device 140a of FIG. 1A. In some embodiments, the processor 170 is further communicatively connected to an image capturing unit 130b. The image capturing unit 130a is configured to capture real-time images at the location of the conference device 120a, such as the conference room, and the processor 170 is configured to process the real-time images for obtaining the real-time video, facial features and/or gesture information of the conference participants nearby. The audio capturing unit 190 is configured to capture real-time audio and the processor 170 is configured to process real-time audio for obtaining voice information from the conference participants nearby. The processor 170 executes operating system and the online conference application, so as to obtain the operation instruction message from the information collected by the image capturing unit 130a and the audio capturing unit 190 and transmit the real-time video/audio, voice information and operation instruction message obtained at the location of the conference device 120a to the server. The processor 170 is also configured to, based on the audio and/or video data transmitted by the server, control the display device 140a to display the corresponding image content, for example, the conference presentation. In addition, the processor 170 executes the online conference application so as to establish the online conference, create various participant types of operation authorizations, and set the scope of permission for each participant type of the operation authorizations on the server.

In some embodiment, the image capturing unit 130 can be implemented by a video camera, a digital camera, a camera module on a mobile device, or other suitable electronic devices capable of capturing images connected to the conference device 120a. In some embodiments, the display device 140a can be implemented by a flat panel display, a projector, or other suitable electronic devices capable of displaying images. In some embodiments, the display device 140a can be integrated with the conference device 120a. In some embodiments, the processor 170 can be implemented by a single or multiple chips of general purpose processor, application specific integrated circuit (ASIC), or field programmable gate array (FPGA). In some embodiments, the mobile device can be a smartphone, a tablet computer, a notebook computer, or other suitable mobile devices.

The abovementioned connections, implementations, and advantages of the various components in the conference device 120a are also applicable to the corresponding components in the conference device 120b. To avoid repetition, details are not described herein again.

The operation flow of the intelligent conference systems according to the present disclosure is described following by taking conference systems in FIG. 1A as examples. The user 150a uses the online conference application on the mobile device 160a, a computer, or the conference device 120a to sign in the video conference server and establish a video conference. The server assigns the user 150a an identity as the conference host, which allows the user 150a to select other users and send out conference invitations. The server generates the conference invitation notifications and sends to the contact email addresses or intelligent conference system accounts of the selected users. The user 150a can assign participant types of conference operation authorizations, as the identities of the participants, to the participants in the video conference respectively, and the types of the identities from high to low may include moderator, presenter, general attendee, and guest auditor. The types of the identities may also be the ranks of other users related to the company or organization to which the user 150a belongs, and the ranks may include senior executive, department head, employee, and visitor from high to low. The host can set the conference operation authorizations corresponding to the types of identities respectively, and the conference operation authorization may include settings of whether to display the operations made by the participants with certain identities, including cursor movement, color marking, line marking, text annotation, page change, page zoom-in or zoom-out, object rotation by a certain angle, adding a new window in the shared conference screen, and selecting a new image content to be displayed in the shared conference screen, etc. The user 150a can set whether to hide the operations of participants with lower identities, that is, participants having lower operating authorizations, when a participant with a higher identity, that is, the participant having higher operation authorizations, is speaking or operating in the video conference. Afterwards, other users, for example, user 150b, remote users 150c and 150d may use the mobile device 160b, the remote mobile device 160c, such as a computer, the remote mobile device 160d or the online conference application on the conference devices 120a and 120b to sign in the video conference server and register for the conference via the conference invitation notifications. The server will provide the user 150a, who host the video conference, with information of the registered participants. The user 150a hosting the conference can approve or deny the registered participants to participate in the conference, and set the identities in the conference for the participants, such as host, presenter, general attendee, or guest. After the video conference starts, the user 150a who is the host can choose a screen, a document or a file uploaded by any user for the video conference via the online conference application, and share the chosen item to all the devices connected to the server participating the video conference, such as the conference devices 120a and 120b, the mobile devices 160a and 160b, and remote mobile devices 160c and 160d. The uploaded screen, document or file is received and processed by the server to generate image content of a shared screen for the video conference, and then the shared screen is transmitted to all user ends, such as all the devices connected to the server participating the video conference. In this manner, all users can see the shared screen chosen by the host via the online conference application. During the video conference, the participants, such as the users 150a and 150b and the remote users 150c and 150d, generate the operation instruction messages by performing operations, including controlling the cursor or operating other functions of the online conference application on the mobile devices 160a and 160b, for example, a computer, the remote mobile devices 160c and 160d, and the conference device 120a or 120b. The operation instruction messages of the users 150a and 150b will be respectively collected by the conference devices 120a and 120b and then transmitted to the server. The operation instruction messages of the remote users 150c and 150d will be directly transmitted to the server respectively by the remote mobile devices 160c and 160d. These operation instruction messages can be processed in real time and the server corresponds each user's operation instruction messages to the operation authorizations and the cursor belong to the user respectively. If a user's operation instruction message does not match his/her operation authorizations, it will be regarded as an invalid operation. All valid operations sent by the users at the same time are processed at the same time, and the server will generate the shared screen by processing the valid operations and the uploaded screens received by the server. The shared screen displays operation results of valid operations with the image content, such as cursor movements that matches operation authorizations, in real time, so that the users participating the conference can see the valid operations of others on the shared screen of the online conference application. In some embodiments, the users 150a, 150b, user 150c and 150d at different locations can respectively use the mobile devices 160a, 160b, 160c and 160d or the conference devices 120a and 120b to conduct a video conference via the installed online conference application at any time, which allows the users to establish a conference, invite participants to join a conference, or join an established conference as participants, upload contents for a shared screen of the conference, send operation instructions, and synchronously see the changes on the shared screen caused by the operation instructions sent from other participants. The server receives and processes the uploaded content of the shared screen, the uploaded video and audio from each conference device participating the conference in real time. The server also transmits the shared screen, the processed video and audio to the conference devices participating the conference in real time, which allows all participating users to watch the shared screen and the real time video of other participating users via the conference devices.

Figure 2:
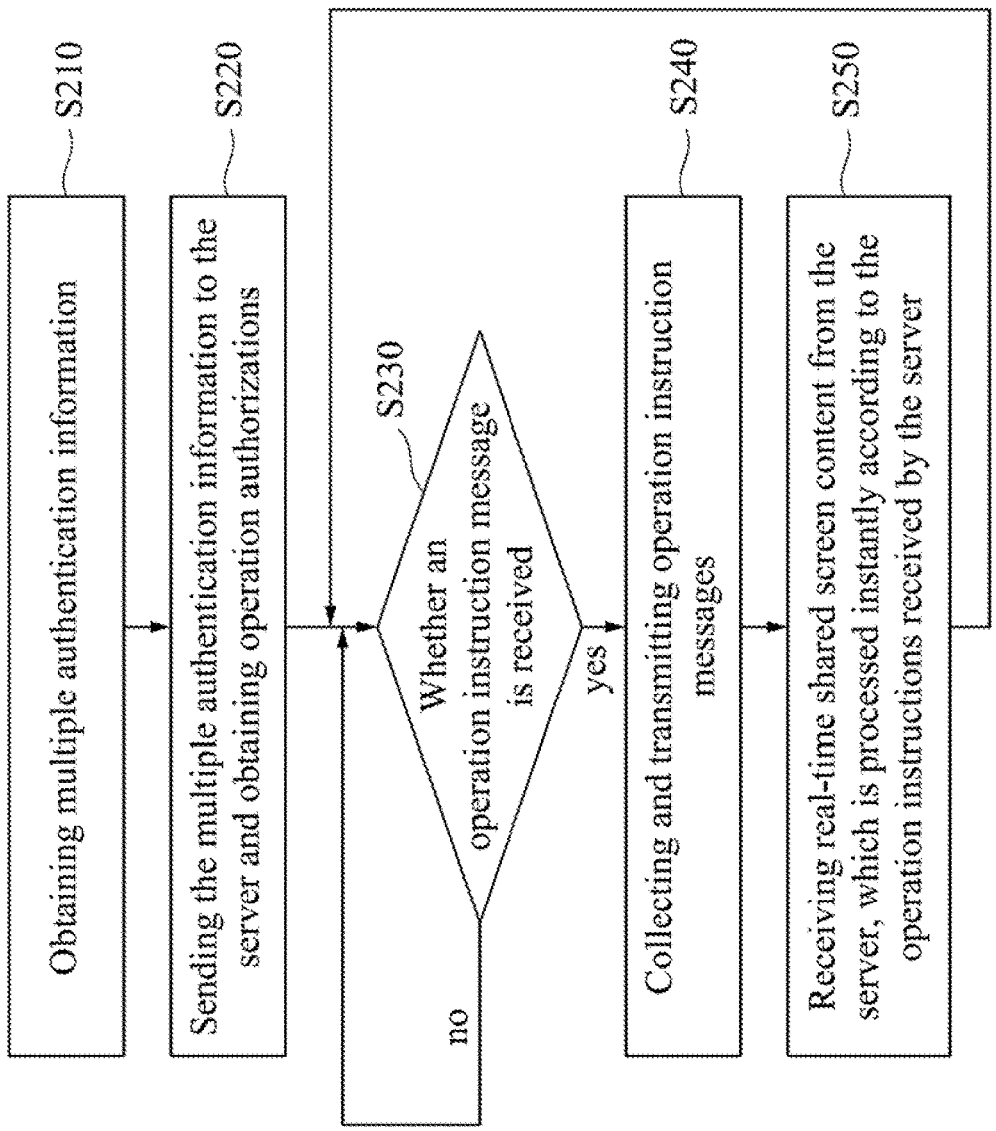
FIG. 2 depicts a flowchart of an operation method according to one embodiment of the present disclosure.

FIG. 2 depicts a flowchart of an operation method 200 according to one embodiment of the present disclosure. The operation method 200 is applicable to the conference device 120a of FIG. 1A at a first location, such as a conference room, or other devices with the online conference application installed, and here the conference device 120a is only used as an example for illustration. Multiple conference devices, which execute the online conference application respectively, can collaborate via a server to hold an online conference, wherein the conference devices participating the online conference constantly collect local video and audio in real time, transmit the local video and audio to the server, and receive the real-time conference video and audio from the server during the online conference. The real-time conference video and audio are selective combination of the local video and audio from at least one conference devices participating the online conference. A procedure of an individual conference device, for example, the conference device 120a, performing the operation method 200 is described as follows.

In step S210, the processor 170 obtains multiple authentication information from multiple instruction sources via the communication unit 180 or the image capturing unit 130a. In some embodiments, the multiple instruction sources may include mobile device 160a. When any unspecified mobile device 160a enters the communication range of the communication unit 180, the user 150a can use the mobile device 160a to open a specific application or connect to a specific webpage, so as to connect to the server via the conference device 120a, and then the user 150a can input and send personal authentication information to sign in a video conference on the server. In some embodiments, the personal authentication information may be one or more of the following: (1) a user's facial features obtained from the real-time image via the image capturing unit 130a; and (2) the user's identity information obtained via the communication unit 180. The identity information includes one or more of the following: e-mail address, a combination of account and password, phone number, biometric feature, and international mobile equipment identity, etc. The processor 170 receives such authentication information from the mobile devices 160a via the communication unit 180, such that the operation authorizations corresponding to each of the users 150a with the mobile devices 160a can be determined respectively in the subsequent step S220.

In some embodiments, the multiple instruction sources may include multiple users 150a. When any unspecified user 150a enters a field of view of the image capturing unit 130a, the processor 170 captures facial features of the user 150a in the real-time image via the image capturing unit 130a which is used as the authentication information of the user 150*a*, so as to determine the respective operation authorizations of each of the users 150*a* in the subsequent step S220.

In step S220, the processor 170 sends the authentication information obtained in step S210 via the communication unit 180 to the server for identity authentication, so that the instruction sources obtain operation authorizations to control a shared content in the online conference respectively. In some embodiments, the shared content may be a screen showing an application, such as text editor software or presentation software, shared by the mobile device 160*a* or 160*b* of the intelligent conference system 110*a* or 110*b* with all participants in the online conference. The shared content may also be a screen showing an application shared by the remote mobile device 160*c* or 160*d*, or a screen showing a cloud application stored in the server shared with all the participants in the online conference. The host device can at any time choose any participant's shared content to share with all the participants in the online conference or set the screen sharing authorization of any participant, which permit the participant to upload the screen to be shared during the online conference.

In some embodiments, the identity authentication process includes comparing the authentication information with registration information of a user pre-stored in the server. The registration information of the user may include one or more of the following: personal e-mail address, a combination of account and password, international mobile equipment identity, phone number, and biometric feature, etc. In some embodiments, the registration information further includes the user's rank information. The rank information can be classified by ranks or titles related to a company, such as senior executive, general employee, or client of the company, etc. The registration information of the users is grouped by company or organization which the users belong to or relate to in the server, and an authenticated group administrator of each group can manage and authenticate the identities and registration information of the users in each group. After the identity authentication process of a user is successful, that is, the authentication information from an instruction source matches the registration information of an authenticated user, the server will grant the corresponding instruction source the operation authorizations corresponding to the rank information in the matched registration information according to the settings made by the establisher of the online conference.

In some embodiments, the establisher of the online conference can initialize a registration program before the online conference starts. The establisher of the online conference can and select users relevant to the online conference and the server generates a registration link, a webpage, or a notification and send to these relevant users. The relevant users can sign in the online conference via the registration link, the webpage, or the online conference application and become the participants of the online conference. The establisher of the online conference can set operation authorizations of the participants in the video of the online conference, and set authorizations, including whether to allow irrelevant users to participate or audit the online conference, whether to allow irrelevant users to share screen or speak during the online conference, and whether to display cursors assigned to irrelevant users in the online conference, etc. In some embodiments, a user intends to participate in the online conference can use a mobile device or a computer to execute the online conference application and register for the online conference, wherein the user provides an account, authorizes the conference system to access the user's identity information of the company or organization to which the user belongs, or provides the identity information by the user himself. The conference host can set request for authenticating the user's identity, for example, an authentication letter or authentication code is sent to the mailbox of the company to which the user 150*a* belongs or the mobile device 160*a* owned by the user 150*a*, and the user 150*a* replies the received authentication letter or authentication code to the intelligent conference system 110*a* for authentication.

In some embodiments, when users from different groups conduct an online conference, the conference host can operate the online conference application to read authenticated identity information of the participating users in their respective groups, such as company names and job titles, from the server. The identity information of a participating user can be displayed next to the user's name, avatar, the user's video screen, or the cursor corresponding to the user on the video conference screen. In some embodiments, a user's identity information is stored in a database or intelligent conference system managed by the company or organization group to which the user belongs. When a user hosts or participates in a video conference, the server reads the user's identity information from the database or intelligent conference system of the group corresponding to the user, and determines authorizations granted to the user and whether to display the user's identity information during the video conference according to the settings made by the host.

In some embodiments, if the server determines that the rank of an instruction source is senior executive officer from the identity authentication result, the server will grant the following operation authorizations to the instruction source: the authorization to switch displayed page(s) of the shared content, the authorization to zoom in and out the displayed page(s) of the shared content, the authorization to move the cursor assigned to the instruction source on the conference screen, the authorization to grant or revoke part or all of the operation authorizations to other users, the authorization to set whether to display the cursor(s) assigned to one or all other users on the conference screen, the authorization to set whether to allow the other users to perform operations other than moving the assigned cursor(s) on the screen of shared content, etc. As another example, if the processor 170 authenticates the identity of the instruction source as a client, the processor 170 probably sets the operation authorization of the instruction source in the conference to only include the authorization to move the cursor assigned to the instruction source on the conference screen. In some embodiments, certain conference participants may have higher level operation authorizations than the conference host.

In step S230, the processor 170 determines whether an operation instruction message is received from the instruction source. In some embodiments, the operation instruction message includes an instruction to perform one or more of the following operations: moving a cursor in the shared content on the conference screen, switching the displayed page of the shared content (for example, switching slide pages or switching to desktop), zooming in or zoom out displayed objects in the shared content, granting or revoking operation authorizations of a user, etc. If the processor 170 does not receive any operation instruction message, the processor 170 repeats step S230 until an operation instruction message is received. In addition to that, if the processor 170 determines that an operation instruction message has been received, the processor 170 then executes step S240.

In some embodiments, the processor 170 may receive a trigger control message in the real-time images or voice information via the image capturing unit 130a (or 130b) or the audio capturing unit 190 before step S230, wherein the trigger control message is from the user directly. For example, the user makes a predetermined triggering gesture, such as raising his hand and straightening his arm, or the user speaks a predetermined triggering phrase. Alternatively, the communication unit 180 may receive the trigger control message from the mobile device 160a (or 160b). For example, the user picks up the mobile device connected to the video conference and shakes it up and down, or the user moves the cursor to or clicks on the displayed user interface element, such as a function menu, a trigger option, or a trigger button, etc., during the video conference. The processor 170 may proceed to step S230 that determines whether the operation instruction message is received from the instruction source only after the trigger control message has been received, so as to save the computing resource of the processor 170. In some embodiments, the same authentication information may correspond to both a user 150a (or 150b) and the mobile device 160a (or 160b) owned by this user. The server can grant the operation authorizations to the user 150a and his mobile device 160a at the same time in step S220, but the processor 170 can only receive the operation instruction message sent by one of the users 150a (or 150b) and his mobile device 160a (or 160b) at once. That is to say, if the user 150a (or 150b) simultaneously sends multiple operation instruction messages by providing a gesture and using the mobile device 160a (or 160b) at the same time, the processor 170 will select one of the operation instruction messages to process.

In step S240, the processor 170 collects all operation instruction messages simultaneously sent from the instruction sources in real time, and transmits these real-time collected operation instruction messages together to the server. As a result, the multiple users 150a can simultaneously operate on the shared content displayed in the online conference via the conference device 120a. Furthermore, the multiple users 150a in the intelligent conference system 110a and multiple users 150b in the intelligent conference system 110b can simultaneously operate on the shared content displayed in the same online conference via respective conference devices 120a and 120b. Each of the intelligent conference system 110a and the intelligent conference system 110b will instantly collect the operation instruction messages sent simultaneously, transmit the instantly collected operation instruction messages to the server for real-time processing, and display the operation results on the video conference screen at the same time.

In some embodiments, the server filters the operation instruction messages from each instruction source according to the operation authorizations granted to each instruction source respectively in step S220. For example, an unspecified user 150a is authenticated as a client in step S220, and the only operation authorization on the conference screen granted to the user with client identity by the conference host is moving the assigned cursor on the shared conference screen. In the subsequent steps, the server can respond to the operation instruction message for moving the assigned cursor sent by the user 150a, such as a gesture or voice command, and ignore the instruction message for page switching operation sent by the user 150a.

In some embodiment, the server sets each of the instruction sources respectively to prohibit such instruction source from generating one or more types of operation instruction messages according to the operation authorizations granted to each of the instruction sources in step S220. For example, a mobile device 160a of an unspecified user 150a is authenticated as a client in step S220, and the only operation authorization on the conference screen granted to the user with client identity by the conference host is moving the cursor on the shared conference screen. Accordingly in step S220, the server will prohibit the mobile device 160a from generating the following types of operation instruction messages via the conference application: switching pages, zooming in and out an object, etc., and only allow the conference application on the mobile device 160a to generate the operation instruction message for moving the assigned cursor. After the conference application on the remote mobile device 160c receives the prohibitions of certain operation instruction message types, the conference application disables the authorizations and settings associated with generation of these prohibited types of operation instruction messages during the video conference which the remote mobile device 160c participates. In addition, the remote mobile device 160c may enable the authorizations and settings after leaving the video conference. The server does not respond to the prohibited types of operation instruction messages from the remote mobile device 160c in the subsequent steps.

In some embodiments, the conference device 120a also filters the operation instruction messages of all the instruction sources nearby according to the operation authorizations granted to each of the instruction sources nearby respectively in step S220. The conference device 120a then transmits the filtered operation instruction messages to the server. In some other embodiments, the conference device 120a also sets each of the instruction sources nearby according to the operation authorizations granted to each of the instruction sources nearby respectively in step S220, which prohibits each of the instruction sources nearby from generating one or more types of operation instruction messages.

In some embodiments, the user 150a can generate and transmit operation instruction messages to the conference device 120a via the mobile device 160a, or by providing a gesture or voice command. In order to obtain the operation instruction messages, the processor 170 can (1) receive specific gestures made by the instruction sources, for example, the user 150a. The specific gestures are provided in the real-time images captured at the location of the conference device 120a by the image capturing unit and the processor 170 can perform image recognitions for obtaining the operation instruction messages corresponding to the gestures; (2) receive voice messages from the instruction sources, for example, the user 150a. The voice messages are provided in the real-time audio captured at the location of the conference device 120a by the audio capturing unit and the processor 170 can perform voice recognitions for obtaining the operation instruction messages corresponding to the voice messages; and/or (3) receive transmission packets generated by the instruction sources, for example, the mobile device 160a), via the communication unit when specific operations are applied to the instruction sources, for example, the mobile device 160a being rotated. The instruction sources generate the transmission packets in response to the specific operations applied to the instruction sources and the contents of the packets are parsed by the processor 170 to obtain the operation instruction messages correspondingly. The processor 170 determines whether the received operation instruction messages are directly from the user 150a, for example, the gesture or voice commands, or from the mobile device 160a, for example, message packets generated by a mobile phone, in order to perform corresponding recognition or parsing process to obtain the operation instructions transmitted by the user. In some embodiments, the processor 170 processes operation instruction messages from different instruction sources, converts into message packets in a same format, and transmits them to the server. The server determines the sources of the operation instruction messages respectively and performs subsequent processing.

In some embodiments, each of the remote mobile devices 160c and 160d also includes the image capturing unit and the audio capturing unit. The remote mobile devices 160c and 160d can respectively capture real-time images and audio in order to obtain the facial features or voiceprints of the remote users 150c and 150d, and send the facial features or voiceprints as the authentication information to the server, such that the server can determine respective operation authorizations of the remote users 150c and 150d or respective operation authorizations of the remote mobile devices 160c and 160d. As a result, the remote users 150c and 150d can also provide voice, gestures and/or make specific operations applied to the remote mobile devices 160c and 160d which generate and send corresponding operation instruction messages to the server. For example, a mobile device captures real-time video and audio including a remote user's speech information via the image capturing unit and/or the audio capturing unit of the mobile device, and the operation instruction messages corresponding to the speech are sent to the server in real time, so the presentation screen of the video conference is operated accordingly.

In step S250, the processor 170 receives the shared content screen of the real-time shared conference screen from the server. The shared content screen is processed instantly by the server according to the received operation instructions in real time. For example, if the processor 170 sends the operation instruction message for switching page and the operation instruction message for moving the cursor respectively from the two users 150a to the server in step S240, in step S250 the server will transmit the image of shared content instantly to all participant devices, wherein the shared content has been adjusted according to the two operation instruction messages. That is, the cursor has been moved and the page of shared content has been switched in the image of shared content according to the two operation instruction messages. After the communication unit 180 receives the new image of shared content, the processor 170 controls the display devices 140a and 140b to display this image of shared content. In summary, by performing the operation method 200, the intelligent conference systems 110a and 110b and the conference devices 120a and 120b allow nearby users 150a and 150b and remote users 150c and 150d to simultaneously operate on the screen of shared content during the online conference, and all the participating users can view the screen of shared content that has been synchronously processed via various participant devices. In this manner, each of the participating users 150a and 150b and the remote users 150c and 150d can directly highlight the item which he/she currently wants to discuss on the shared screen of the online conference, so that other participating users can notice the focus of the discussion in real time. As a result, the course of discussion during the online conference is as easy to understand as the on-the-spot meeting. A detailed description of step S250 is further provided in the following paragraphs with reference to FIG. 3.

Figure 3:
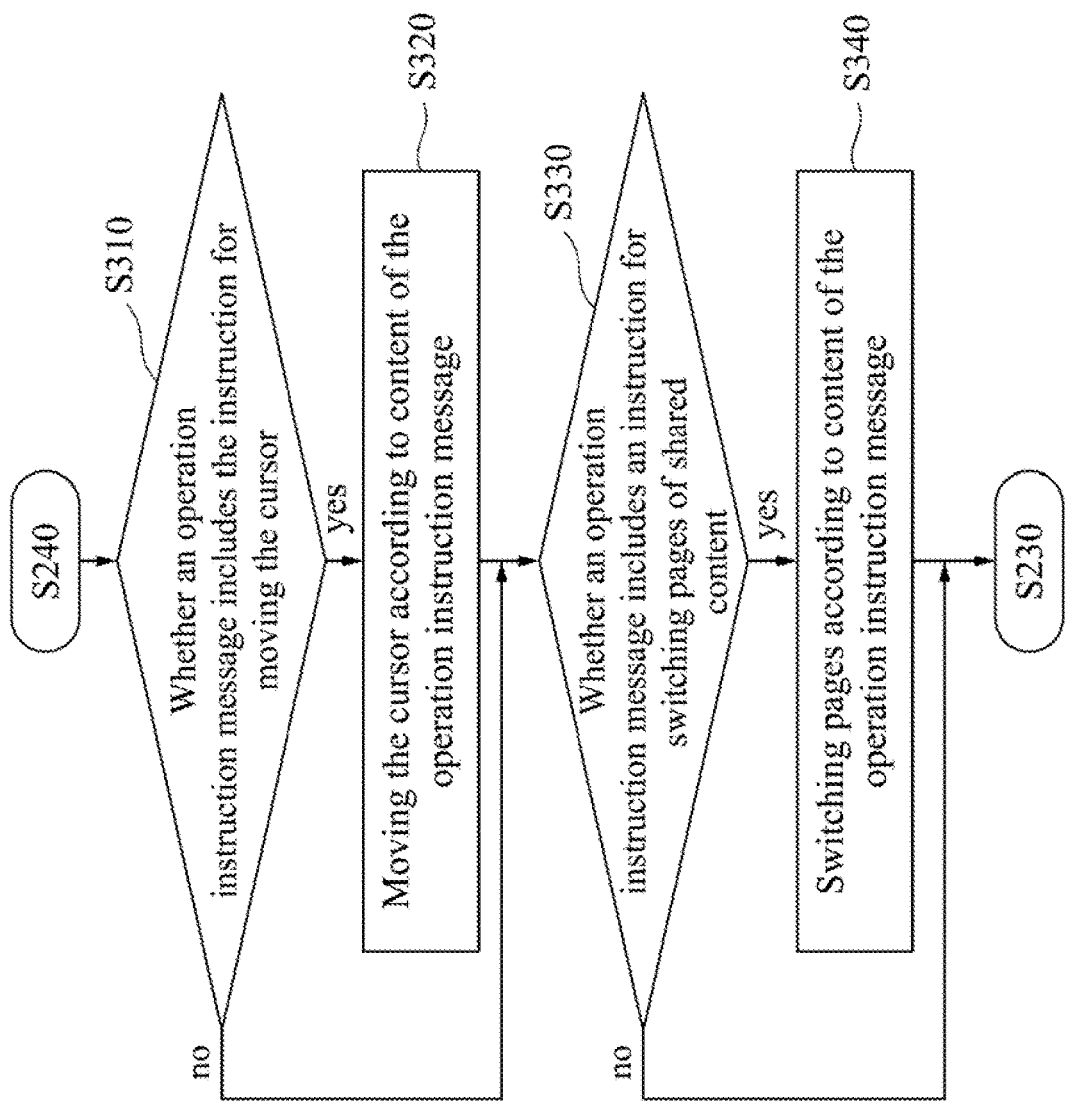
FIG. 3 depicts a detailed flowchart of part of the steps in FIG. 2.

FIG. 3 depicts a detailed flowchart of step S250 in FIG. 2 of the present disclosure. As mentioned above, during a video conference, during the video conference, the processor 170 constantly collects local video and audio in real time, transmits the local video and audio to the server, and receives the real-time conference video and audio from the server. The real-time conference video and audio are selective combination of the local video and audio, including the shared content screen, from at least one conference devices participating the online conference. The processor 170 also collects the operation instruction messages generated by different participating instruction sources, which may include various operation instructions and will result in changes on the screen of shared content after the operation instruction messages have been filtered and processed based on the operation authorizations granted to the participating instruction sources respectively. To simplify matters, the flow in FIG. 3 only describes the two instructions for moving the cursor and switching content pages. Steps corresponding to other types of operation instructions, such as color marking, line marking, adding annotation, zoom-in or zoom-out displayed object, or switching to desktops, etc., may be arranged before step S310, between steps S320 and S330, or after step S340.

In step S310, the server or the processor 170 determines whether an operation instruction message of an instruction source include the instruction for moving the cursor corresponding to the instruction source. If the operation instruction message includes the instruction for moving the cursor, the processor 170 proceeds to step S320. If the operation instruction message does not include the instruction for moving the cursor, the processor 170 skips step S320 and directly proceeds to step S330.

In step S320, the server or the processor 170 has already determined in previous step S310 that the operation instruction message includes the operation instruction indicating a user 150a wants to move the assigned cursor, so the server or the processor 170 processes to move the cursor assigned to the user 150a according to content of the operation instruction message. For example, the cursor is moved to a specific position on the shared conference screen according to the coordinates, movement vectors, or other parameters related to the cursor's movement included in the operation instruction message. In some embodiments, the user 150a can simultaneously make other operation instructions in addition to move the cursor. For example, the user 150 selects one or more operation functions in the online conference application on the mobile device, like marking functions, annotation functions, or other functions and moves the cursor. The operation instruction message generated by the online conference application will include the operation instructions for the selected operation functions and cursor movement. The server will process the operation instruction message accordingly, and generate the shared conference screen showing the operation results of, for example, color marking, line marking, or other capable marking effects based on the motion trail of the cursor, or displaying an annotation field at the cursor's position on the shared content of the shared conference screen. After that, the user can operate the mobile device to input annotations, and the shared conference screen will show the user's input results in the annotation field displayed on the shared content in real time. The user can also select the options of adding pictures, tables, files, links, or text, etc., at the cursor's position on the shared conference screen. In one embodiment, the user-added marks, annotations, or other details added on the page of the shared content shown in the shared conference screen is stored at the server end. After the shared content in the shared conference screen is switched to another page or closed during the online conference, the page with user-added details is still stored for a certain period of time. Therefore, when the shared content is switched back to this page, the previously added marks, annotations, or other user-added details are still displayed on the page to all participants in the online conference.

In one embodiment, the operation instruction for moving the assigned cursor comes from the mid-air finger pointing gesture of the user 150a, such as pointing a finger, for example, the index finger, in air toward the display screen and moving the finger up, down, left, or right. The image capturing unit 130a captures continuous images of the gesture movements, and the processor 170 analyzes the moving directions and the motion vectors of the gesture movements from the captured images and generates an operation instruction for the cursor assigned to the user 150a to move following the gesture movements. The operation instruction is transmitted to the server which generates the shared conference screen showing that the assigned cursor is moved in response to the operation instruction. In another embodiment, the operation instruction for moving the assigned cursor comes from specific phrases, such as "move down" or "move right", spoken by the user 150a, and the audio capturing unit 190 captures the voice signal uttered by the user. The processor 170 analyzes and processes the captured voice signal to obtain the operation instruction in the voice spoken by the user and upload the operation instruction to the server, or the processor 170 uploads the captured voice signal to the server which analyzes and processes the captured voice signal to obtain the operation instruction in voice. The server generates the shared conference screen showing that the assigned cursor is moved in response to the voice operation instruction, wherein the cursor assigned to the user 150a moves in a direction corresponding to the voice operation instruction from the user 150a. In one embodiment, the user 150a can provide voice or gesture as the operation instructions sent for marking, annotating, or adding other details on the shared conference screen, and such operation instructions can be combined with the operation instructions for moving the assigned cursor. Therefore, the markings, annotations, or other details can be added at the assigned cursor's position on the shared content of the shared conference screen and all the participants of the online conference can see the added details.

Figure 4:
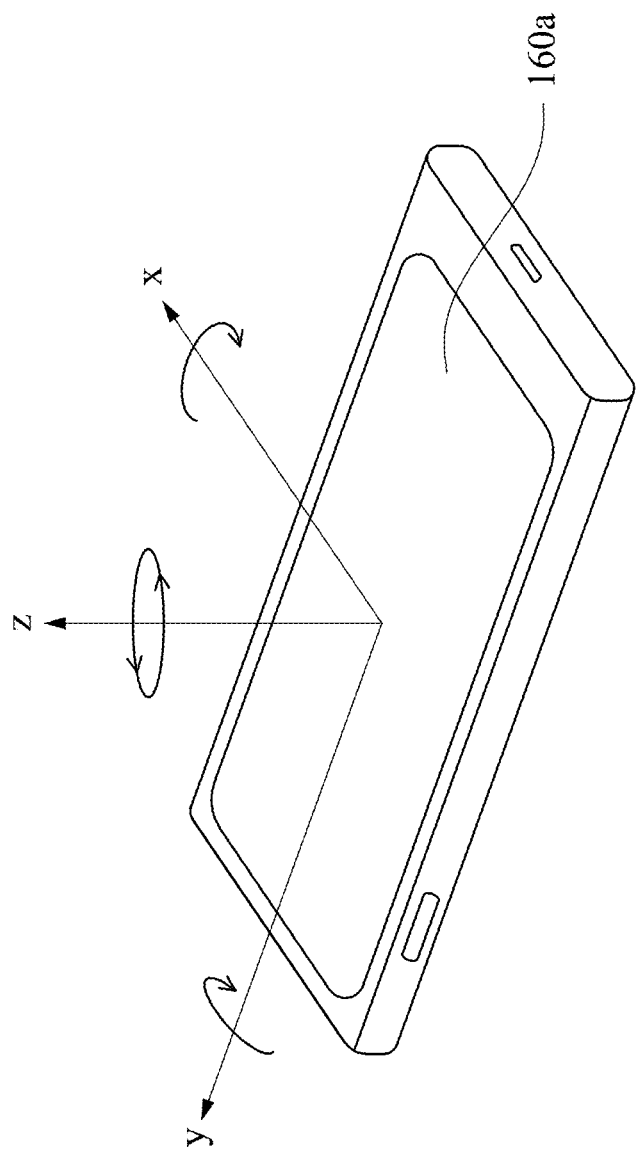
FIG. 4 depicts a schematic diagram of a communication device according to one embodiment of the present disclosure.

A description is provided with reference to FIG. 3 and FIG. 4. In another embodiment, the instruction source can be the mobile device 160a. When the user rotates the mobile device 160a, the mobile device 160a and the online conference application executed on the mobile device 160a generate transmission packets based on the rotation angles around one or more of the three dimensional axes, for example, the x-axis, the y-axis, and the z-axis in FIG. 4, and the transmission packets are transmitted to the conference device 120a nearby. The processor 170 can parse these transmission packets to obtain the operation instruction message, which includes a corresponding instruction for moving the assigned cursor. For example, the transmission packets may include the rotation angle of the mobile device 160a around the x-axis, and the processor 170 obtains the operation instruction message including vertical movement information of the assigned cursor according to the transmission packets. The vertical movement information is used to control a vertical movement of the assigned cursor on the shared conference screen with shared content. The transmission packets may include the rotation angle of the mobile device 160a around the z-axis, and the processor 170 obtains the operation instruction message with horizontal movement information of the assigned cursor according to the transmission packets. The horizontal movement information is used to control a horizontal movement of the assigned cursor on the shared conference screen with shared content. The user can rotate the mobile device 160a at will, and the gyroscope, accelerometer, or other sensors in the mobile device 160a will simultaneously detect the rotating angles around the x-axis and the z-axis. The operation instruction messages corresponding to these detected rotating angles will be obtained so as to make the assigned cursor move in oblique directions on the screen synchronously. In other words, the shared conference screen displays the real-time states of the assigned cursors, including the moving speed, acceleration, displacement, and displacement direction, [ . . . ] etc. of the cursor graphics, as the operation instruction messages applied to the assigned cursors respectively. In some embodiments, the mobile device 160a rotating around the y-axis will trigger the processor or the server to determine whether the mobile device 160a has the authorizations to adjust the size of the content page, rotate the content page, or switch the content pages in the shared conference screen. If the mobile device 160a has the authorizations, the server obtains the operation instruction messages for adjusting the size of the content page, rotating the content page, or switching the content pages in the shared screen, based on the rotation directions and angles of the mobile device 160a around the y-axis, and the shared conference screen with shared content will be instantly generated based on the operation results of the operation instruction messages and transmitted to all participant devices. It should be noted that the instructions generated from the rotation of the mobile device 160a around the three axes can be set and modified depending on the needs of the user 150a, and can also be replaced by each other. The present disclosure is not limited to the above embodiments which are taken for example.

In some embodiments, the x-axis and the y-axis are the coordinate axes of the horizontal plane perpendicular to the direction of gravity and are perpendicular to each other. The z-axis is the coordinate axis perpendicular to the horizontal plane, which is parallel to the direction of gravity.

In step S330, the server or the processor 170 determines whether the operation instruction messages received from the respective instruction sources include an instruction for switching pages of shared content. If there is an instruction for switching pages received, the processor 170 proceeds to step S340. If there is no instruction for switching pages, the processor 170 can skip step S340 and execute step S230 again. In some embodiments, in step S330 the server or the processor 170 further determines whether the operation instruction messages include any function instructions, such as content page zoom-in or zoom-out adjustment, rotating a certain angle, screenshotting, adding a new shared screen window or displaying a file or information selected by a participating user in the new shared screen window, etc. These function instructions are executed after the operation instruction messages are filtered according to the operation authorization settings.

In step S340, the server or the processor 170 has already determined in step S330 that the operation instruction messages include an operation instruction from a certain user 150a which requests to switch the displayed content page. In one embodiment, the operation instruction for switching content page comes from the user 150a who makes a palm closed gesture with five straight fingers of one hand and moves the hand left or right. For example, when the user 150a makes the palm closed gesture and moves left or right, or up or down alternatively, the processor 170 determines the gesture made by the user 150a and the moving direction of the gesture via the Image recognition technology, and then switches the displayed slide of the shared content to the previous page or the next page respectively, but the present disclosure is not limited in this regard. In another embodiment, for example, when of the user 150a makes the gesture move towards his/her left or right side, or up or down, and a desktop or home screen is displayed in the screen of shared content, the processor 170 determines the gesture made by the user 150a and the moving direction of the gesture via the Image recognition technology, and then instructs the operation system of the displayed desktop or home screen to move the displayed desktop or home screen to left or right respectively, so as to switch the display screen among multiple desktop or home screens of the operating system. In another embodiment, the operation instruction for switching content pages comes from specific phrases, such as "next page" or "previous page", etc., spoken by the user 150a. The processor 170 determines the operation instruction of the phrases spoken by the user 150a via the voice recognition technology and switches the displayed slide page of the shared content to the corresponding page accordingly. As the conference devices constantly capture local video and audio and transmit the captured video and audio to the server during the video conference, the processors within the conference devices can identify and obtain the operation instructions in the captured video and audio in real time.

A description is provided with reference to FIG. 3 and FIG. 4. In some embodiments, the instruction source may be the mobile device 160a. When the mobile device 160a is rotated in a specific direction, the processor 170 is triggered to switch the displayed page. For example, when the mobile device 160a is rotated in a first direction about the y-axis, for example, the clockwise direction indicated by the illustrated arrow on the y-axis in FIG. 4, the processor 170 switches the displayed slide page to the next page. When the mobile device 160a is rotated in a second direction about the y-axis, for example, the counter-clockwise direction opposite to the direction indicated by the illustrated arrow on the y-axis in FIG. 4, the processor 170 switches the displayed slide to the previous page. However, the present disclosure is not limited in this regard.

The above-mentioned methods and steps performed by the user 150a and the mobile device 160a for generating the operation instruction messages are described with reference to FIG. 3 and FIG. 4 and also applicable to the remote users 150c and 150d and the remote mobile devices 160c and 160d correspondingly. In step S330, the server can process and determine whether operation authorizations permit the operation instructions generated by the remote users 150c and 150d and the remote mobile devices 160a and 160b. To simplify matters, a description in this regard is not provided. In some embodiments, the remote users 150c and 150d can utilize the touch screens, mice, keyboards, trackballs, or other input devices of the remote mobile devices 160c and 160d to operate, and the remote mobile devices 160c and 160d will generate operation instruction messages correspondingly. The real-time shared conference screen with shared content from the server is received by the remote mobile devices 160c and 160d after the server filter and process the generated operation instruction messages respectively based on the authorization settings. Changes made by the operations of remote users 150c, 150d or the other online conference participants are displayed in the shared conference screen, such as cursor movements, color markings, line markings, text annotations, page changes, page zoom-in or zoom-out, object rotation by a certain angle, screenshotting, adding a new shared window in the shared conference screen, and select a new content to be displayed in the shared conference screen, etc.

Figure 5:
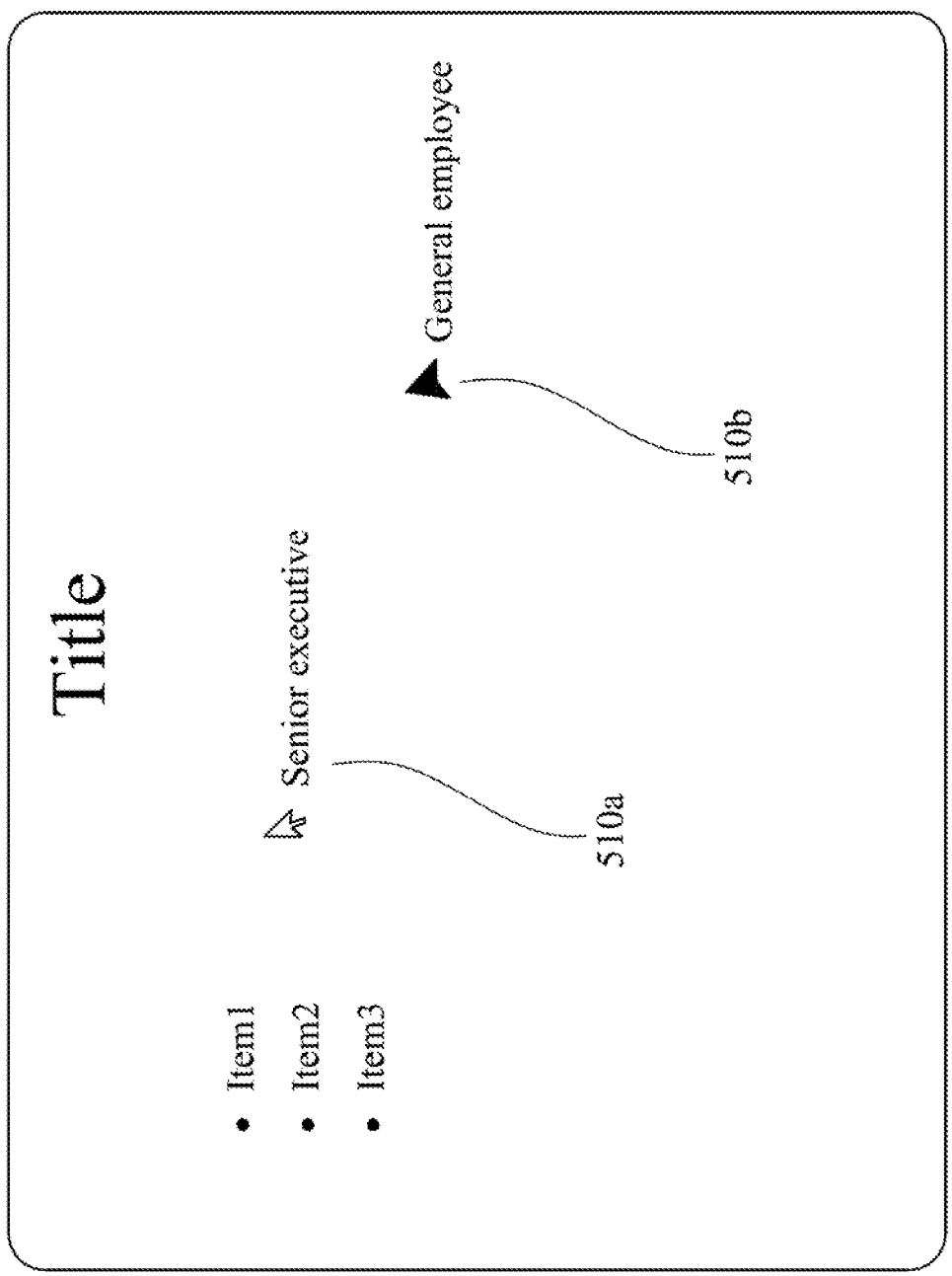
FIG. 5 depicts a schematic diagram of shared content displayed by a display device according to one embodiment of the present disclosure.

FIG. 5 depicts the display screen of shared content 500 on the display device 140a or 140b according to one embodiment of the present disclosure. FIG. 5 is used to illustrate the scenario in which users 150a and 150b and remote users 150c and 150d operate on the shared content 500 of the online conference at the same time. A cursor 510a is the cursor controlled by the user 150a, and a cursor 510b is the cursor controlled by the remote user 150d. In FIG. 5, identities of the users are respectively marked next to the assigned cursors respectively. The host or the users can set whether to display the marked identities respectively. A description is provided with reference to FIG. 1 and FIG. 5. The participating devices receive the real-time video and audio of the video conference from the server, wherein the real-time video contains real-time conference screen including the display screen region of the local captured video from the participating devices and the display screen region of the shared content in the video conference. The real-time conference screen is combination of the display screen regions of local captured video from the participating devices and the shared contents, and the areas occupied by each region can be automatically adjusted by the server or according to the conference host's settings. In some embodiments, the cursor 510a can be understood as a cursor which the user 150a provides gesture or voice or uses the mobile device 160a to control, and the cursor 510b can be understood as another cursor which the remote user 150d provides gesture or voice or uses the remote mobile device 160d to control. In some embodiments, as shown in FIG. 5, one or more cursors can be simultaneously displayed in the shared content 500 of the shared conference screen and movements of the cursors can be respectively displayed in real-time. These cursors can be distinguished from each other by different labels, colors, cursor patterns, or names of the corresponding users. In some embodiments, the processor 170 can simultaneously control the cursors 510a and 510b respectively according to the requests of the user 150a and the remote user 150d, such as the operation instruction messages. For example, the processor 170 controls the movements of the cursors 510a and 510b respectively corresponding to the operation instructions of user 150a and the remote user 150d, and determines to display or hide the cursors 510a and 510b in the shared conference screen according to settings made by the host or the user 150a and the remote user 150d. For instance, when the user 150a as a senior executive is speaking during the online conference, the processor 170 can display or hide the cursor 510b in the shared conference screen according to the setting made by the conference host or the user 150a, and the processor also can hide the cursor 510a or other cursors of the other non-speakers in the shared conference screen according to the settings made by the conference host. In some embodiments, when the cursors of the other non-speakers are hidden in the shared conference screen according to the settings, the non-speaking users can still respectively see their own cursors on the mobile devices that they are using or on the display device 140a of the intelligent conference system 110a nearby the non-speaking users. However, participants other than the non-speaking users cannot see the hidden cursors assigned to the other non-speaking users on their respective mobile devices, and the display device of the intelligent conference system 110b remote to the non-speaking users also will not display the cursors assigned to the non-speaking users. The above description only takes the cursor movement as an example for illustration. The intelligent conference system 110*a* of the present disclosure can also process other function operation instructions of the users, including color marking, line marking, text annotating, page changing, page zoom-in or zoom-out, rotating a certain angle, screenshotting, adding a new shared screen window, and displaying a selected content in the new shared screen window, etc. In one embodiment, the conference host can make setting that result from any operation instructions sent by a participant when he/she is not speaking will not be displayed in the shared conference screen for all participants. Only the participant who has made the operation instructions but is not speaking in the online conference can see the result of his/her operations on his/her mobile device or the display device of the intelligent conference system nearby. When a participant user speaks, the result from the operations he/she already made will be shared with the other participants and displayed on the shared conference screen, such as the assigned cursor's current position, color marking, line marking, text annotating, page changing, page zoom-in or zoom-out, rotating a certain angle, adding a new shared screen window, and selecting a content to be displayed in the new shared screen window, etc. As a result, the user can operate to generate the operation instruction(s) in advance when he/she is not speaking, and does not need to occupy more time to operate when he/she is speaking in the online conference.

In some embodiments, the conference host of the intelligent conference system can also make function settings including: whether to display the cursors corresponding any participating users at any time, whether to allow the participating users who do not have the authorizations to switch content pages to request for switching content pages, whether to allow an auditing or a guest user to speak, whether the server automatically generates records of the online conference and the participating users who can receive the conference records, etc. In some embodiments, the conference host can obtain the list of conference participants and the registered identity information of the participants that has been authenticated. If a participant has not been registered or a participant's identity cannot be authenticated, the intelligent conference system will notify the conference host. The conference host can remove the participant from the online conference via the online conference application. In some embodiments, the conference host can set a conference participant as the presenter, and the presenter can select a file or an application window on a mobile device or computer to upload and share the screen of the selected item with the other participating users. The presenter can also operate to switch pages of the selected item as shard content. When the presenter speaks or operates, such as moving the assigned cursor or other functions, the server will only display the operation results of the host and the presenter on the shared conference screen to all participants, and the results of cursor moving or other function operations made by the other participating users may not be displayed on the shared conference screen to all participants. In some embodiments, the participating user who is not the host or the presenter can still see the movement of the cursor assigned to him/her or other results of functional operations made by himself in the shared conference screen on his/her own device. The server will only provide the shared conference screen with the cursor movement or other results of functional operations made by this specific user to the specific user's own mobile device, and the devices of the other participating users do not receive this shared conference screen with the operation results made by the specific user. That is, participating users who are not the host or the presenter can only make cursor moving or other function operations at their own devices during the online conference.

In some embodiments, the conference host can initiate a vote during the conference. The conference establisher can set himself or another participant as the host, and the host can set or select which participants can participate the voting decision. For example, only users whose identity is above a certain level can participate the voting decision as voters. The online conference application provides a setting interface for the host to set the matters to be voted and select the participants who are entitled to vote. The online conference application also provides participants with a voting interface according to the host's settings, which allows the participants to decide their voting options respectively. The server will receive the votes completed by the participants and count the voted options, and the result of the vote process is displayed on the shared conference screen of the online conference application according to the host's settings.

The intelligent conference system according to the present disclosure allows multiple users to respectively control the displayed screens of the intelligent conference system at the same time, so as to facilitate the participants other than the presenter to illustrate or ask questions during the conference. In the traditional conference system for comparison, the user is required to use a laser pointer or move to the control console to illustrate his/her presentation, and it is impossible to quickly illustrate and ask questions if the presenters are at different locations. The intelligent conference system according to the present disclosure can facilitate the participants other than the presenter to quickly operate on the conference screen and illustrate opinions or questions, and the intelligent conference system can be controlled by the users at the same time which facilitate the users to discuss with others.

Certain terms are used in the specification and claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A video conference device comprising:

a camera, configured to capture a real-time video of a first location, and configured to capture a first biometric feature of a first user located at the first location with the video conference device as first authentication information;

a communication circuit configured to be communicatively connected to a remote server; and a processor configured to execute an online conference application, and configured to process the real-time video of the first location captured by the camera and real-time visual signals received from the remote server via the communication circuit;

wherein the processor executes the online conference application to establish or join an online video conference on the remote server, the processor receives the first authentication information from the camera, and sends the first authentication information via the communication circuit for identity authentication;

wherein the processor receives first operation authorizations granted to the first user by the remote server based on the first authentication information which is recognized as a first participant of the online video conference, the first operation authorizations enable the first user to control a first representative cursor assigned to the first participant of the online video conference on a real-time conference screen;

wherein the processor receives a specific gesture of the first user via the camera, recognizes the specific gesture to obtain a first operation instruction message, and transmits the first operation instruction message to the remote server in real time;

wherein the communication circuit transmits the processed real-time video of the first location to the remote server and receives the real-time visual signals of the online video conference from the remote server, the real-time visual signals of the online video conference provide images of the real-time conference screen which includes a real-time shared content screen;

wherein if the first operation instruction message includes a first operation instruction of moving the first representative cursor and the first operation instruction is valid based on the first operation authorizations and display settings of the online video conference, the real-time conference screen displays the first representative cursor positioned in the real-time shared content screen in response to the first operation instruction of moving the first representative cursor;

wherein the processor further performs one or more of the following:

processing the captured real-time video of the first location to receive a second biometric feature of a second user as second authentication information;

transmitting the second authentication information via the communication circuit for the identity authentication;

receiving second operation authorizations granted to the second user by the remote server based on the second authentication information, wherein the second authentication information is recognized as a second participant of the online video conference, wherein the second operation authorizations enable the second user to control a second representative cursor assigned to the second participant of the online video conference on the real-time conference screen;

processing the captured real-time video of the first location to receive a specific gesture made by the second user, and recognizing the specific gesture to obtain a second operation instruction of moving the second representative cursor; and transmitting the second operation instruction to the remote server via the communication circuit if the second operation instruction is valid according to the second operation authorizations.

2. The video conference device of claim 1, wherein when the first authentication information is corresponding to a host of the online video conference, the first operation authorizations include a host authorization.

3. The video conference device of claim 2, wherein the host authorization grants the host to set whether to hide at least the second representative cursor assigned to the second participant of the online video conference.

4. The video conference device of claim 1, wherein the real-time conference screen includes a display screen region showing the real-time video captured at the first location.

5. The video conference device of claim 1, wherein the processor is configured to:

obtain the first operation instruction of moving the first representative cursor or the second operation instruction from the first operation instruction message;

filter the first operation instruction of moving the first representative cursor or the second operation instruction according to the first operation authorizations corresponding to the first authentication information, wherein the first operation authorizations include first cursor operation authorizations and first content operation authorizations; and transmit the first operation instruction of moving the first representative cursor or the second operation instruction to the remote server via the communication circuit if the first operation instruction of moving the first representative cursor or the second operation instruction is valid according to the first content operation authorizations or the first cursor operation authorizations.

* * * * *